United States Patent
Imaizumi

(10) Patent No.: US 11,277,560 B2
(45) Date of Patent: Mar. 15, 2022

(54) IMAGE CAPTURING APPARATUS

(71) Applicant: CANON KABUSHIKI KAISHA, Tokyo (JP)

(72) Inventor: Takuya Imaizumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/128,927

(22) Filed: Dec. 21, 2020

(65) Prior Publication Data

US 2021/0203848 A1 Jul. 1, 2021

(30) Foreign Application Priority Data

Dec. 25, 2019 (JP) .............................. JP2019-233630

(51) Int. Cl.
*H04N 5/232* (2006.01)
*H04N 5/225* (2006.01)

(52) U.S. Cl.
CPC ....... *H04N 5/23258* (2013.01); *H04N 5/2252* (2013.01); *H04N 5/22525* (2018.08); *H04N 5/23287* (2013.01)

(58) Field of Classification Search
None
See application file for complete search history.

(56) References Cited

U.S. PATENT DOCUMENTS

2018/0103205 A1* 4/2018 Kikuchi ............... H04N 5/2251

FOREIGN PATENT DOCUMENTS

JP 2018-060160 A 4/2018

* cited by examiner

*Primary Examiner* — James M Hannett
(74) *Attorney, Agent, or Firm* — Cowan, Liebowitz & Latman, P.C.

(57) ABSTRACT

The image capturing apparatus includes an exterior unit fixed to a main body of the image capturing apparatus, and a shake detection unit that is disposed in an accommodation area located in the exterior unit, and is configured to detect a shake of the image capturing apparatus. The image capturing apparatus further includes a reinforcing member that is disposed in the accommodation area, and reduces deformation of the exterior unit due to an external force applied thereto. The reinforcing member is disposed between the exterior unit and the main body when the external force is applied.

9 Claims, 5 Drawing Sheets

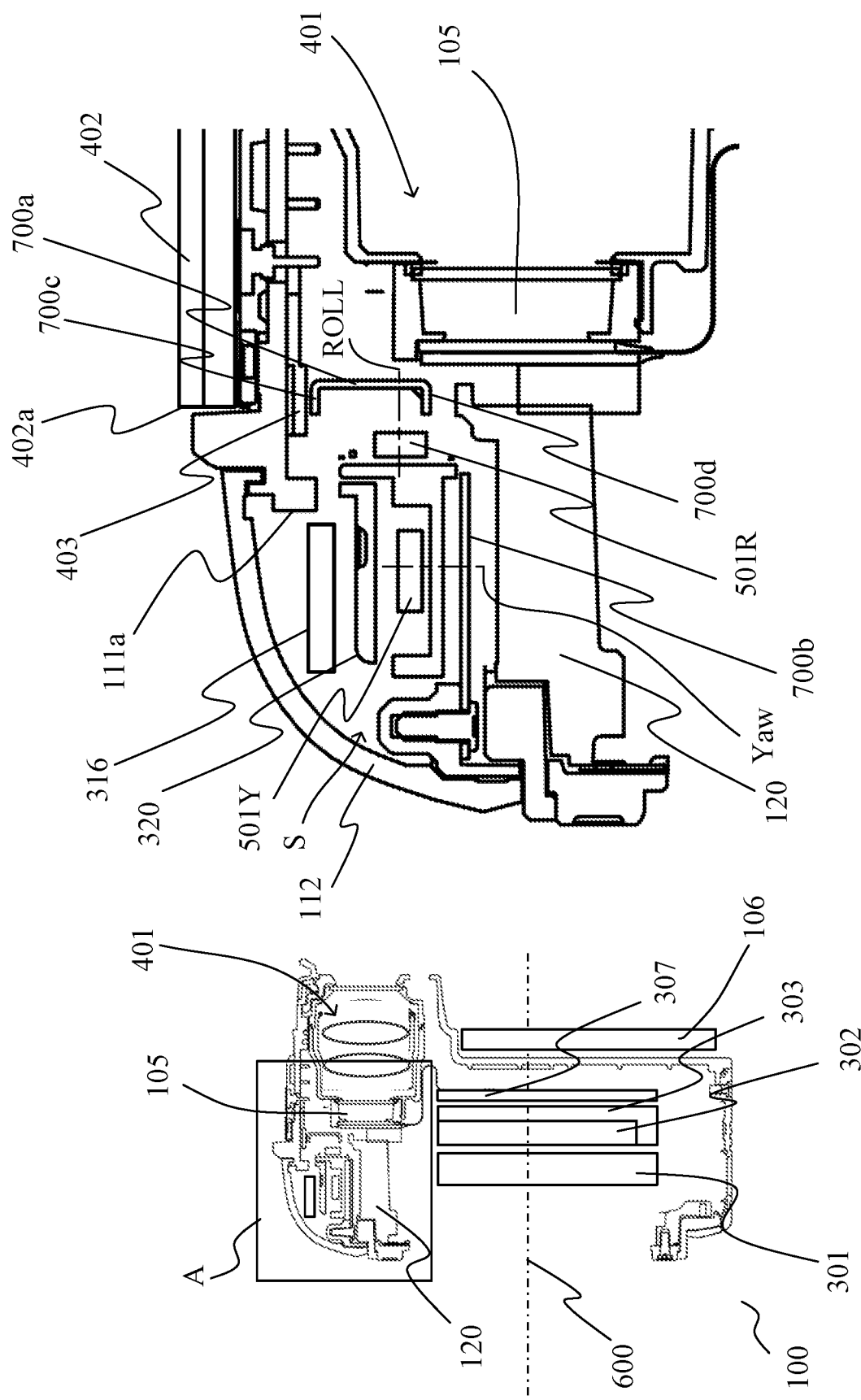

IMAGE CAPTURING APPARATUS

BACKGROUND OF THE INVENTION

Field of the Invention

The present invention relates to an image capturing apparatus (hereinafter referred to as "a camera") having a shake detection unit.

Description of the Related Art

Cameras are provided, each of which includes a shake detection unit constituted by a gyro sensor or the like, and performs image blur correction (image stabilization) operation depending on a camera shake detected by the shake detection unit. In such cameras, vibration generated by operation of a shutter (hereinafter referred to as "shutter vibration") may be detected by the shake detection unit, which may cause erroneous image stabilization operation. Japanese Patent Laid-Open No. 2018-60160 discloses a camera that holds a shake detection unit by using a cushioning material such that shutter vibration is less likely to be transmitted to the shake detection unit.

However, an external force such as an impact force applied to the camera may change the posture (angle) of the shake detection unit with respect to a main body of the camera. In this case, the shake detection unit may detect vibration in a direction different from an actual camera shake direction, which may make it impossible to perform a good image stabilization operation. In the camera disclosed in Japanese Patent Laid-Open No. 2018-60160, no countermeasure is taken against the change in posture of the shake detection unit with respect to the camera's main body.

SUMMARY OF THE INVENTION

The present invention provides an image capturing apparatus capable of reducing an influence of an external force on a shake detection unit.

The present invention provides as an aspect thereof an image capturing apparatus including an exterior unit fixed to a main body of the image capturing apparatus, a shake detection unit that is disposed in an accommodation area located in the exterior unit, and is configured to detect a shake of the image capturing apparatus, and a reinforcing member that is disposed in the accommodation area, and reduces deformation of the exterior unit due to an external force applied thereto. The reinforcing member is disposed between the exterior unit and the main body when the external force is applied Further features of the present invention will become apparent from the following description of exemplary embodiments with reference to the attached drawings.

BRIEF DESCRIPTION OF THE DRAWINGS

FIGS. 4A and 4B are sectional views of the camera of the embodiment.

DESCRIPTION OF THE EMBODIMENTS

Exemplary embodiments of the present invention will hereinafter be described with reference to the accompanying drawings.

Figure 1:
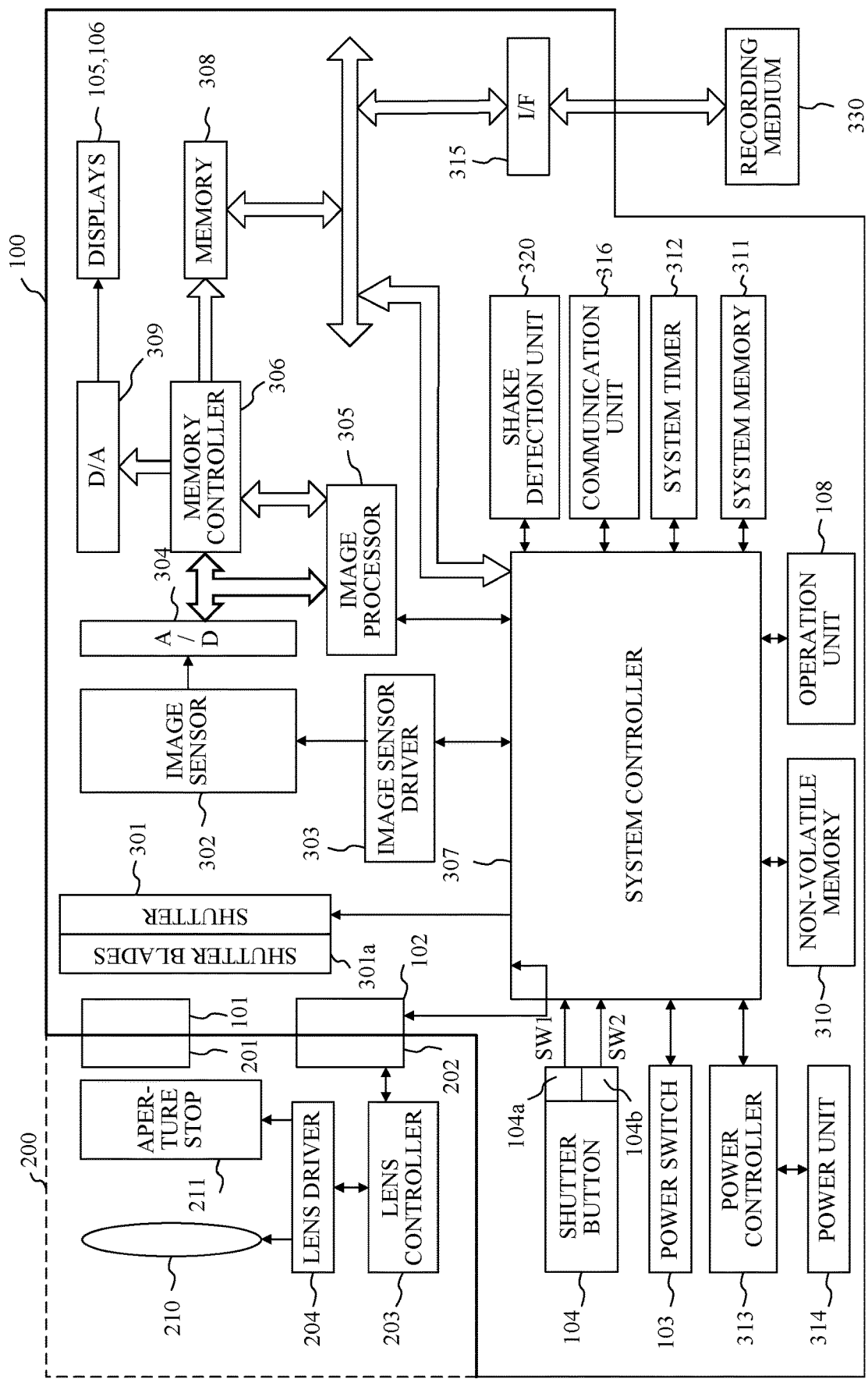
FIG. 1 is a block diagram illustrating a configuration of a camera that is an embodiment of the present invention.
Figure 2:
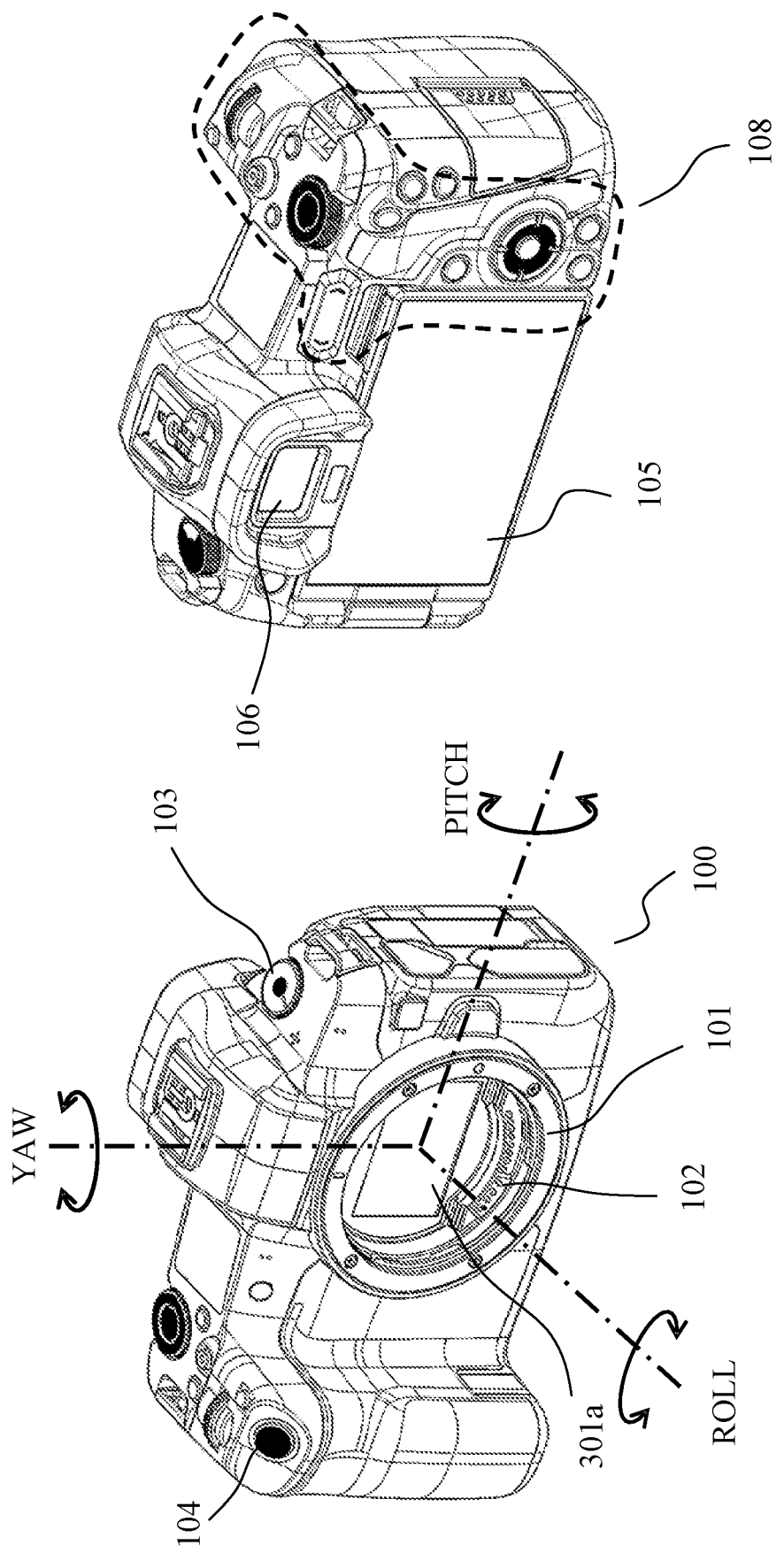
FIG. 2 is a perspective view of the camera of the embodiment.

FIG. 1 illustrates a configuration of a digital camera (hereinafter simply referred to as "a camera") 100 as an image capturing apparatus that is an embodiment of the present invention. FIG. 2 illustrates an external view of the camera 100. The camera 100 is a lens-interchangeable camera to which an interchangeable lens unit 200 illustrated in FIG. 1 is detachably attachable. The interchangeable lens unit 200 is attached to the camera 100 by bayonet-coupling of a lens mount 201 provided in the interchangeable lens unit 200 with a camera mount 101 provided in the camera 100.

In the camera 100, an image sensor 302 constituted by a CCD sensor, a CMOS sensor or the like captures an optical image (object image) formed by an image capturing optical system in the interchangeable lens unit 200 to convert the optical image into an electric signal (analog image capturing signal). A shutter 301 disposed on a front side (object side) of the image sensor 302 blocks light from entering the image sensor 302 in a non-image capturing state, and opens and closes during image capturing to control an exposure amount of the image sensor 302.

An A/D converter 304 converts the analog image capturing signal output from the image sensor 302 into a digital image capturing signal to output it to an image processor 305 and a memory controller 306. The image processor 305 performs a pixel interpolation process, a resizing process, a color conversion process and an AWB (auto white balance) process on the digital image capturing signal input from the A/D converter 304 or the memory controller 306 to generate recording or displaying image data. Further, the image processor 305 performs various calculation processes using the generated image data. A system controller 307 performs an AF (autofocus) process and an AE (automatic exposure) process using calculation results obtained by the image processor 305.

The memory controller 306 writes the image data to a memory 308. The memory 308 also serves as an image display memory (video memory). A D/A converter 309 converts the displaying image data written in the memory 308 into an analog image signal to supply it to a viewfinder display 105 or a rear display 106. As a result, an image corresponding to the displaying image data written in the memory 308 is displayed as a live-view image on the viewfinder display 105 or the rear display 106, and a confirmation image corresponding to the recording image data is displayed on the viewfinder display 105 or the rear display 106. The viewfinder display 105 and the rear display 106 are each constituted by a display device such as an LCD. The viewfinder display 105 disposed in a viewfinder 401 as illustrated in FIGS. 4A and 4B enables a user looking into the viewfinder 401 to observe an object.

A non-volatile memory 310 constituted by an EEPROM or the like stores constants, programs and the like for operation used by the system controller 307. The system controller 307 including at least one processor controls the camera 100 and the interchangeable lens unit 200. A system memory 311 constituted by a RAM stores constants and variables for operation of the system controller 307, and develops the programs read from the non-volatile memory 310. The system controller 307 also controls the memory 308, the D/A converter 309, the viewfinder display 105 and the rear display 106 to perform image display control.

A system timer 312 measures a current time and times used for various controls. A first shutter switch 104a is turned on by a user's half-press operation (image capturing preparation instruction) of a shutter button 104 provided on the camera 100 to generate a first shutter switch signal SW1. In response to the first shutter switch signal SW1, the system controller 307 starts an image capturing preparation process including the AF process, the AE process and the AWB process. A second shutter switch 104b is turned on by a user's full-press operation (image capturing instruction) of the shutter button 104 to generate a second shutter switch signal SW2. In response to the second shutter switch signal SW2, the system controller 307 starts an image capturing process including controlling of opening/closing of shutter blades 301a provided in the shutter 301, reading of the image capturing signal from the image sensor 302, and writing of the recording image data to the recording medium 330.

The shutter blades 301a move at a high speed in the shutter 301 in a direction orthogonal to an optical axis of the image capturing optical system (hereinafter referred to as "an image capturing optical axis), and hit against a stopper member (not illustrated) in the shutter 301 to instantaneously stop their movement. An impact generated by the hit of the shutter blades 301a against the stopper member causes the entire shutter 301 to vibrate in the direction orthogonal to the image capturing optical axis, which is the same direction as the movement direction of the shutter blades 301a. The vibration generated by the shutter 301 (hereinafter referred to as "shutter vibration") is transmitted to a main body 120 described later to which the shutter 301 is screwed, and further to the system controller 307 screwed to the main body 120, a top cover unit 110 described later and the like.

An operation unit 108 includes buttons and dials operated by the user, a touch panel provided on the rear display 106 and the like.

A power controller 313 is constituted by a battery detection circuit, a DC-DC converter, a switch circuit for switching blocks to be energized and the like, and detects whether or not a battery is installed, type of the installed battery and a remaining battery level. Further, the power controller 313 controls the DC-DC converter depending on a detection result and an instruction from the system controller 307 to supply a necessary voltage to the blocks including the recording medium 330 for a necessary time period.

A power unit 314 is constituted by a primary battery, a secondary battery, an AC adapter or the like. A recording medium I/F 315 is an interface with the recording medium 330 such as a memory card or a hard disk. The recording medium 330 is a semiconductor memory, an optical disk, a magnetic disk or the like for recording the generated recording image data.

A communication unit 316 performs wireless communication with external apparatuses to transmit and receive the displaying and recording image data, audio data, various other data to and from the external apparatuses. The communication unit 316 is connectable also to a wireless LAN (Local Area Network) or the Internet.

The system controller 307 in the camera 100 and a lens controller 203 provided in the interchangeable lens unit 200 communicate with each other via a connector 102 provided in the camera 100 and a connector 202 provided in the interchangeable lens unit 200. The system controller 307 sends a focus command signal and a stop command signal to the lens controller 203. The lens controller 203 drives, in response to these commands, a focus lens 210 and an aperture stop 211 included in the image capturing optical system via the lens driver 204.

A shake detection unit 320 constituted by using a gyro sensor or the like detects shakes of the camera 100 (each hereinafter referred to as "a camera shake") in three directions illustrated in FIG. 2; a pitch direction around a pitch axis, a yaw direction around a yaw axis; and a roll direction around a roll axis. The shake detection unit 320 outputs a signal indicating an angular velocity of the camera shake. The system controller 307 calculates a magnitude of the camera shake (hereinafter referred to as the camera shake amount) from the angular velocity signal.

An image sensor driver 303 moves the image sensor 302 in a plane orthogonal to the image capturing optical axis depending on the calculated camera shake amount to perform optical image blur correction (optical image stabilization). Further, the image processor 305 performs electronic image blur correction (electronic image stabilization) by moving an image clipping position in the image data depending on the camera shake amount.

Figure 3:
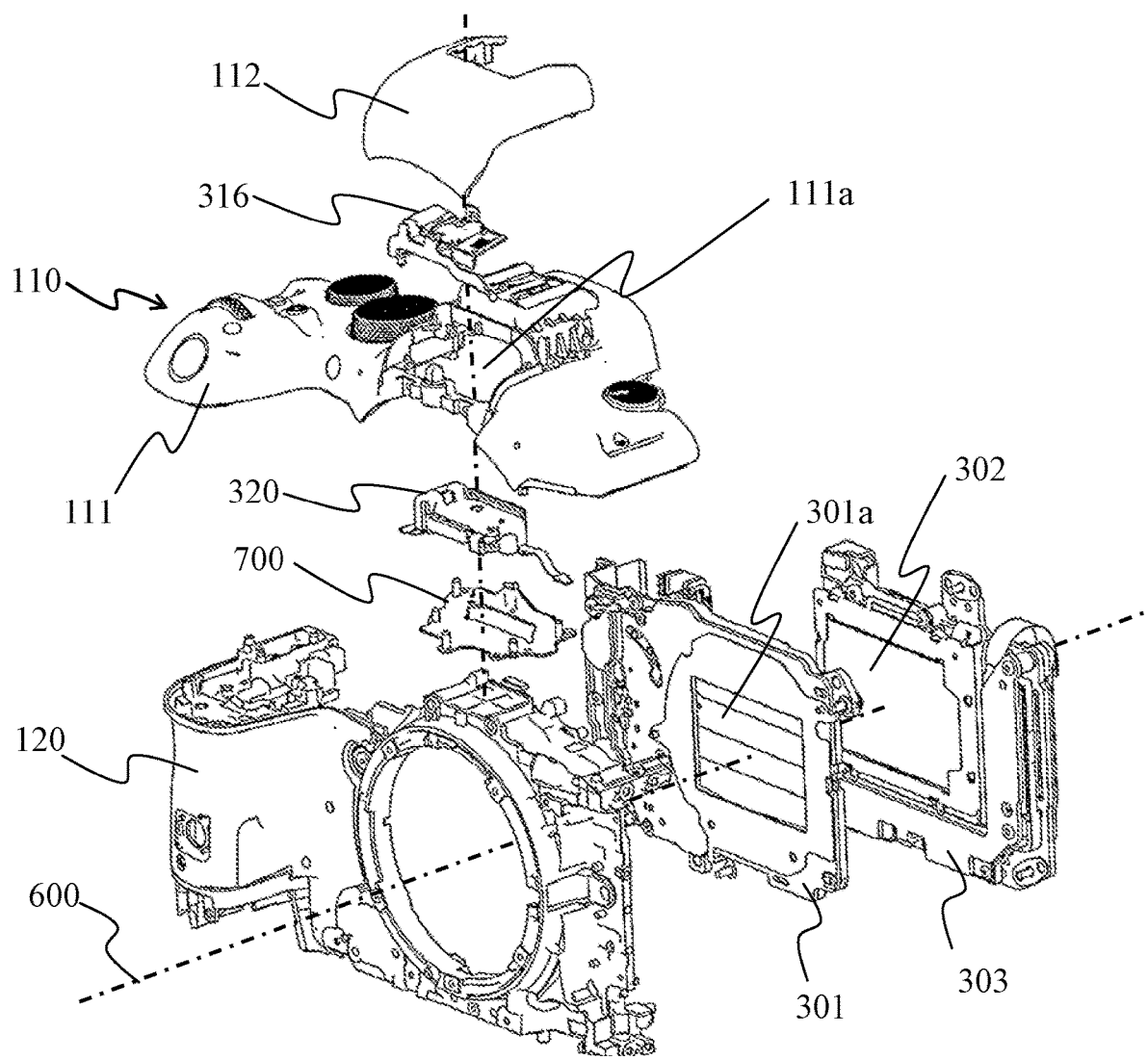
FIG. 3 is an exploded perspective view of the camera of the embodiment.

FIG. 3 illustrates a part of the camera 100 in an exploded manner. Reference numeral 600 denotes the image capturing optical axis. The main body 120 is a structural member (chassis) that ensures strength of the camera 100. The shutter 301, the image sensor driver 303 and the system controller 307 illustrated in FIG. 1 are screwed to the main body 120, and the top cover unit 110 as an exterior unit is screwed to an upper part of the main body 120. The shake detection unit 320 is screwed to a reinforcing member 700, and the reinforcing member 700 is screwed to the top cover unit 110 from its inside. The reinforcing member 700 is manufactured as a metal plate made of a stainless alloy. The reinforcing member 700 may be made of other metals or engineering plastics such as polycarbonate. The communication unit 316 is screwed to the top cover unit 110 from its outside.

A top cover 111 of the top cover unit 110 is made of a highly conductive material (a carbon-containing resin, a magnesium alloy, etc.) as a countermeasure against electromagnetic noise of the camera 100. The communication unit 316 cannot be covered with a highly conductive material in order to perform wireless communication with the outside. Therefore, the top cover 111 has an opening portion 111a capable of accommodating the communication unit 316, and an antenna cover 112 made of a non-conductive material is screwed to the top cover unit 110 so as to cover the communication unit 316 accommodated in the opening portion 111a.

FIG. 4A illustrates a section of the assembled camera 100 cut along the image capturing optical axis 600. FIG. 4B illustrates a part A in FIG. 4A in an enlarged manner. As illustrated in these figures, the communication unit 316 and the shake detection unit 320 are accommodated in an accommodation area S as a space surrounded on three sides by the main body 120, the antenna cover 112 and the viewfinder 401 (or the viewfinder display 105). Further, the communication unit 316 and the shake detection unit 320 are disposed in the accommodation area S that is an upper front area in the camera 100, the area being located on the object side further than the viewfinder 401 and being farther from the image capturing optical axis 600 than the main body 120. The communication unit 316 and the shake detection unit 320 are arranged one above the other so as to be close (adjacent) to each other.

In the accommodation area S, the communication unit 316 is disposed at a position farther than the image capturing optical axis 600 than the shake detection unit 320. The shake detection unit 320 has a flexible substrate having conductivity and thereby hindering wireless communication. Therefore, such an arrangement enables good wireless communication without being hindered by the flexible substrate. Although in this embodiment the communication unit 316 and the shake detection unit 320 are arranged close to each other in an up-and-down direction as described above, the communication unit 316 may be disposed at a position on the object side further than the shake detection unit 320.

The shake detection unit 320 includes a gyro sensor 501R that detects the camera shake around the roll axis (first detection axis), a gyro sensor 501Y that detects the camera shake around the yaw axis (second detection axis), and a gyro sensor (not illustrated) that detects the camera shake around the pitch axis. The reinforcing member 700 is disposed in the accommodation area S together with the shake detection unit 320, and reduces deformation of the top cover unit 110 due to an external force applied to the top cover unit 110.

The reinforcing member 700 has a first flat surface portion (first reinforcing portion) 700a orthogonal to the roll axis. The first flat surface portion 700a is disposed between the shake detection unit 320 and the viewfinder 401. Further, the reinforcing member 700 has a second flat surface portion (second reinforcing portion) 700b orthogonal to the yaw axis. The second flat surface portion 700b is disposed between the shake detection unit 320 and the main body 120.

Figure 5A:
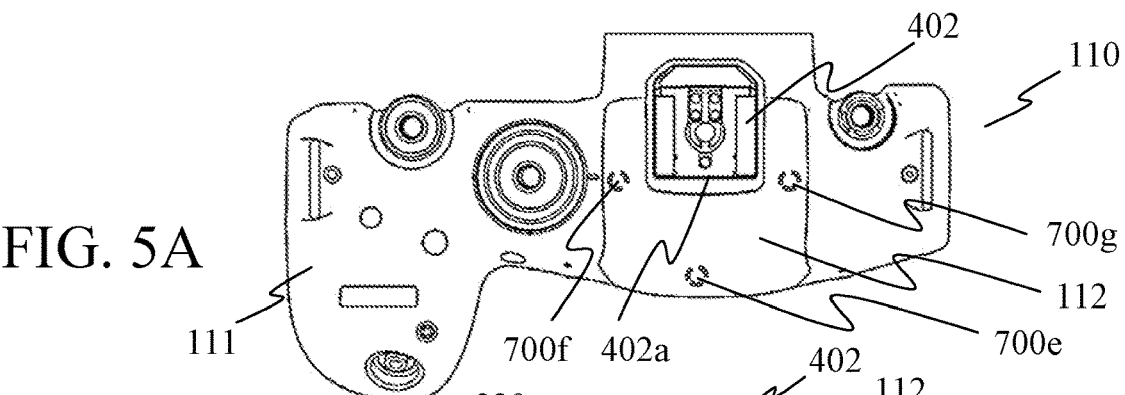
FIGS. 5A to 5E illustrate a top cover unit of the camera of the embodiment.
Figure 5B:
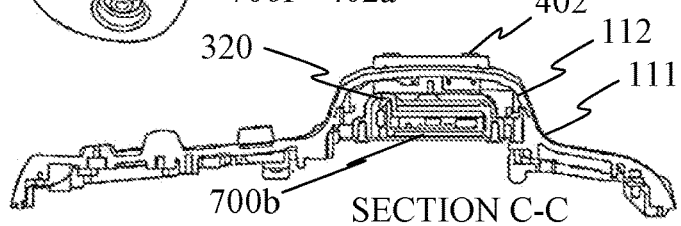
Figure 5C:
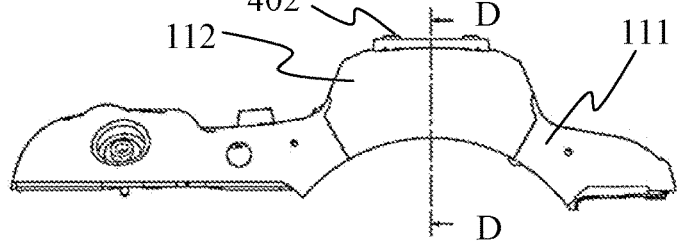
Figure 5D:
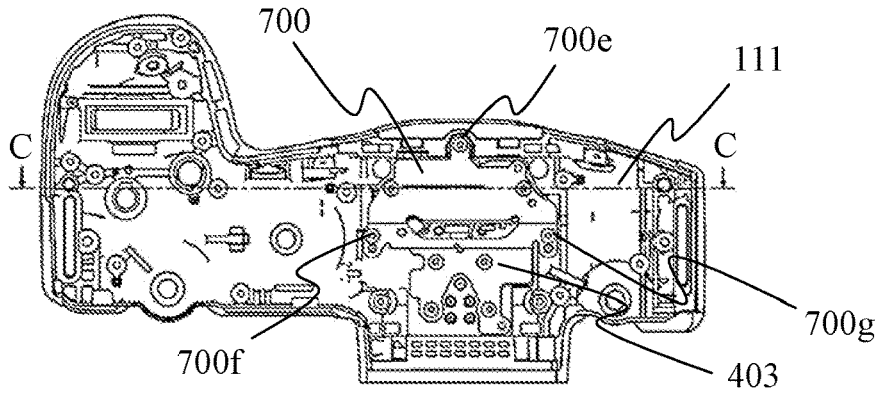
Figure 5E:
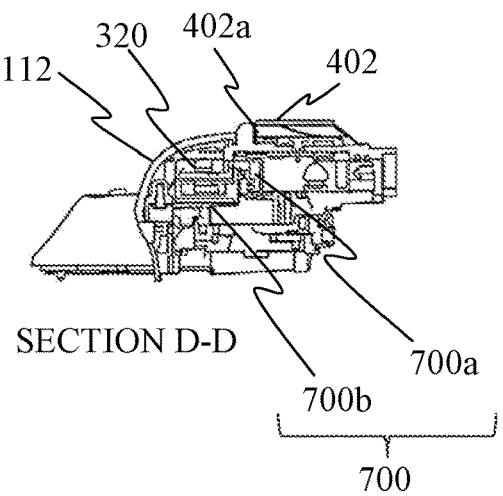

FIG. 5A illustrates the top cover unit 110 viewed from above. FIG. 5D illustrates the top cover unit 110 viewed from below. FIG. 5B illustrates a section of the top cover unit 110 cut along a line C-C in FIG. 5D. FIG. 5C illustrates the top cover unit 110 viewed from front. FIG. 5E illustrates a section of the top cover unit 110 cut along a line D-D in FIG. 5C.

As illustrated in FIGS. 5B and 5E, the shake detection unit 320 is covered by the antenna cover 112 disposed above the unit 320, the second flat surface portion 700b of the reinforcing member 700 disposed below the unit 320, the antenna cover 112 and the top cover 111 disposed on right and left sides of the unit 320, the antenna cover 112 disposed in front of the unit 320, and the first flat surface portion 700a of the reinforcing member 700 disposed in back of the unit 320. In this way, the shake detection unit 320 is disposed inside a so-called "box" constituted by the antenna and top covers 112, 111 as exterior members and the reinforcing member 700.

Such a "box" having surfaces (walls) on six sides is difficult to be deformed by an external force such as an impact force even if the external force is applied to the "box" due to fall of the camera 100 or the like. Therefore, change in posture (angle) of the shake detection unit 320 inside the camera 100 with respect to the camera 100 is reduced. Thus, even if the external force is applied to the camera 100, the camera shake can be accurately detected, and thereby a good image stabilization operation can be performed.

Further, as illustrated in FIG. 4B, the top cover unit 110 has an accessory shoe 402 on its top surface. The accessory shoe 402 is screwed to the top cover 111 from its inside via a shoe holding member 403.

The reinforcing member 700 has, at an upper end of the first flat surface portion 700a, a first contact surface 700c that makes contact with the shoe holding member 403 when an external force is applied. The first contact surface 700c is disposed near an object-side end 402a of the accessory shoe 402. Further, the reinforcing member 700 has, at a lower end of the first flat surface portion 700a, a second contact surface 700d that makes contact with the main body 120 when the external force is applied.

The most protruding portion of the camera 100 on its top surface side is the accessory shoe 402. Thus, the accessory shoe 402 is likely to receive a large external force by hitting the ground or a floor surface due to fall of the camera 100. Further, since the top cover 111 is provided with the opening portion 111a in which the communication unit 316 is accommodated, the top cover 111 has a low strength around the opening portion 111a. In the accessory shoe 402 that is likely to receive the external force, a portion having a low strength near the opening portion 111a is an object-side end 402a of the accessory shoe 402. Therefore, disposing the reinforcing member 700 that receives the external force between the vicinity of the object-side end 402a of the accessory shoe 402 and the main body 120 that is the structural member ensuring the strength of the camera 100 can provide a high reinforcing effect that reduces deformation of the top cover 111 when the external force is applied.

As illustrated in FIG. 5D, the reinforcing member 700 has fixing portions 700d, 700f and 700g, and is screwed to the top cover 111 at each fixing portion. That is, the reinforcing member 700 is also a member that fixes the shake detection unit 320 to the top cover 111 (top cover unit 110). Dotted circles illustrated in FIG. 5A indicate positions of the fixing portions 700e, 700f and 700g. The fixing portions 700f and 700g are arranged on an extension line extending the object-side end 402a of the accessory shoe 402 to right and left.

As described above, the object-side end 402a of the accessory shoe 402 is vulnerable to the external force. Further, the top cover 111 has a dome shape at its center as illustrated in FIG. 5B, and a bottom part of the dome shape is easy to spread to right and left. The reinforcing member 700 is fixed at the dome-shaped bottom part of the top cover 111, that is, at positions on both sides of the accommodation area S of the top cover 111 at the fixing portions 700f and 700g. Thereby, the spread of the bottom portion is reduced to make it possible to protect the shake detection unit 320 accommodated inside the dome shape from the external force.

This embodiment enables reducing an influence of the external force such as the impact force on the shake detection unit 320, and thereby enables performing accurate shake detection and good image stabilization even if the external force is applied to the camera 100.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-233630, filed on Dec. 25, 2019 which is hereby incorporated by reference herein in its entirety.

What is claimed is:

1. An image capturing apparatus comprising:
   an exterior unit fixed to a main body of the image capturing apparatus;
   a communication unit that is disposed in an opening portion located in the exterior unit;
   a shake detection unit that is disposed in the opening portion located in the exterior unit, and is configured to detect a shake of the image capturing apparatus;

a reinforcing member that is used for fixing the shake detection unit to the exterior unit, and reduces deformation of the exterior unit due to an external force applied thereto;

an antenna cover that is made of a material which is less conductive than the exterior unit, and that covers the opening portion, wherein the reinforcing member includes a contact surface that does not make contact with the exterior unit and the main body when the external force is not applied and that makes contact with the exterior unit and the main body when the external force is applied.

2. The image capturing apparatus according to claim 1, wherein:

the exterior unit includes an accessory shoe, and a shoe holding member that holds the accessory shoe, and the first contact surface makes contact with the shoe holding member when the external force is applied.

3. The image capturing apparatus according to claim 1, wherein:

the image capturing apparatus has a viewfinder for observing an object, and the reinforcing member includes a first reinforcing portion disposed between the shake detection unit and the viewfinder.

4. The image capturing apparatus according to claim 3, wherein:

the shake detection unit is configured to detect a shake around a first detection axis; and the first reinforcing portion has a planar surface orthogonal to the first detection axis.

5. The image capturing apparatus according to claim 1, wherein the reinforcing member includes a second reinforcing portion disposed between the shake detection unit and the main body.

6. The image capturing apparatus according to claim 5, wherein:

the shake detection unit is configured to detect a shake around a second detection axis orthogonal to the first detection axis; and the second reinforcing portion has a planar surface orthogonal to the second detection axis.

7. The image capturing apparatus according to claim 1, wherein the reinforcing member is fixed to the exterior unit at positions on both side of the opening portion.

8. An image capturing apparatus comprising:

a first exterior unit fixed to a main body of the image capturing apparatus;

a shake detection unit that is disposed in the first exterior unit, and is configured to detect a shake of the image capturing apparatus;

a fixing member that is used for fixing the shake detection unit to the first exterior unit, wherein the fixing member includes a reinforcing portion for reducing deformation of the first exterior unit due to an external force applied thereto, and wherein the reinforcing portion does not make contact with the first exterior unit and the main body when the external force is not applied, and makes contact with the exterior unit and the main body when the external force is applied.

9. The image capturing apparatus according to claim 8, further comprising:

a second exterior unit that makes contact with the first exterior unit, wherein the reinforcing portion has a function for reducing the deformation of the first exterior unit due to the external force applied thereto, the function formed in a peripheral portion of an area where the second exterior unit and the first exterior unit make contact with each other.

\* \* \* \* \*